Nov. 22, 1966 W. R. KRITZLER ET AL 3,286,340

FABRICATION OF SEMICONDUCTOR UNITS

Filed Feb. 28, 1964 2 Sheets-Sheet 1

INVENTORS
WILLIAM R. KRITZLER
VICTOR C. SIRVYDAS
BY
Frank P Rogers
ATTORNEY

INVENTORS
WILLIAM R. KRITZLER
VICTOR C. SIRVYDAS
BY
Frank D Prager
ATTORNEY 3,286,340
FABRICATION OF SEMICONDUCTOR UNITS William R. Kritzler, Newton Center, Mass., and Victor C. Sirvydas, Hatboro, Pa., assignors to Philco Corporation, Philadelphia, Pa., a corporation of Delaware
Filed Feb. 28, 1964, Ser. No. 348,071
7 Claims. (Cl. 29—471.1)

Figures 1, 2, 3, 4, 5:
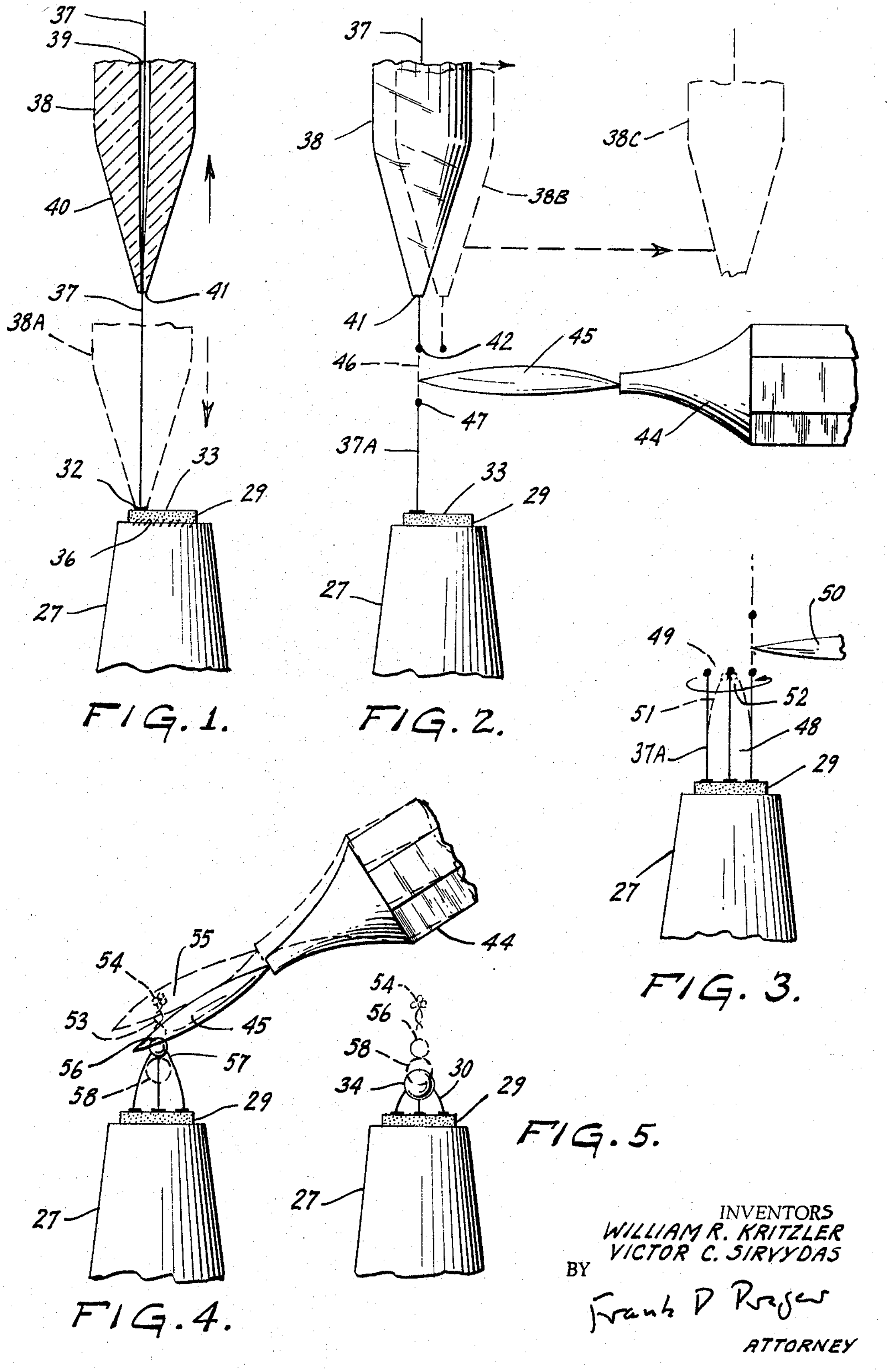

This invention relates to the construction of semi-conductors, specifically the fabrication of semiconductive diodes, and will be described as applied to the making of such a diode.

More particularly the invention has to do with a method of fabricating diodes which can control high currents at high frequency. The diodes produced by the new method are structurally characterized by certain connector elements which facilitate the desired high current high frequency service.

It has been usual for some time to connect a high current high frequency diode to other circuit components by a group of thin connector wires; however, great difficulties were encountered in the processes of forming and using such connections.

Each wire of such a group must have one end connected individually to a junction area on the semiconductor, and all wires must have opposite ends connected to a common terminal; such an arrangement is known to be needed since it is essential to provide a relatively large amount of wire cross-section in order to "dissipate the power," involved in the high current operation, without undue heating, and since it would be undesirable, in view of the "skin effect" as encountered mainly at high frequencies to combine the total cross-sectional wire area into a single and relatively thick wire. Attempts were therefore made to attach the largest possible number of the smallest possible wires to the minute diode surface, and to a common terminal, by available methods of micromanipulation.

Some of the most difficult problems, involved in the use of such groups of tiny wires, had to do with the pulses of the current passing through the wires. It is desired to distribute the currents uniformly over the several wires; this however was impossible because of seemingly unavoidable irregularities of resistive effects, encountered in various portions of the solder terminal structure wherein the thin wires were joined. It is also desirable to make these wires extremely short in order that reactance be reduced in the high frequency service of the unit; this was found impossible when using the wire connecting methods and structures known up to now. At best, the thin wires were twisted into a structure of rope-like cross-section and an attempt was made to solder-connect the several wires of the twisted structure, one to the other, and all to the common terminal. However, the distribution and adhesion of solder in a closely packed arrangement of extremely thin wires is unpredictable. Thus it was necessary for mechanical reasons to make the solder joints and wires much longer than is desirable electrically; yet the current distribution was still unequal and unsatisfactory. There was similar trouble then known equivalents of solder connection were used.

It is the object of this invention to overcome these former difficulties.

This has been achieved by exposing the wires mounted on the diode body to a new sequence of operations, including certain heating and cooling steps, to produce a peculiar connector structure. In a preferred way of carrying out the new method each wire is flame cut to predetermined length and is thereby provided with a small terminal bead; the beads are then united into a cluster and subjected to further flame heating, thereby transforming said cluster into a metal sphere into which the wires merge; and heat is then applied to said sphere and utilized by means of the same, to melt additional wire portions, which in turn results in growth and downward displacement of the sphere. A sphere and wire unit of characteristic form is thus produced, which is then exposed to further treatment for soldering it to a connecting terminal. The process results in formation of a minute "spider" with thin and short metallic wires or legs joined into a spherical metallic body, said body being ultimately embedded in a solder bead wherefrom the thin metallic wires minutely project to the diode surface.

These operations and the product thereof will be illustrated and described herein. In the drawing, FIGURES 1 to 5 are enlarged elevational views schematically showing successive stages of the fabricating process.

Figure 10:
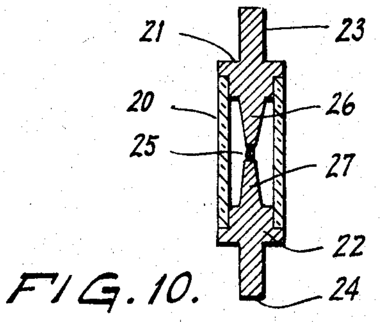
Figure 6:
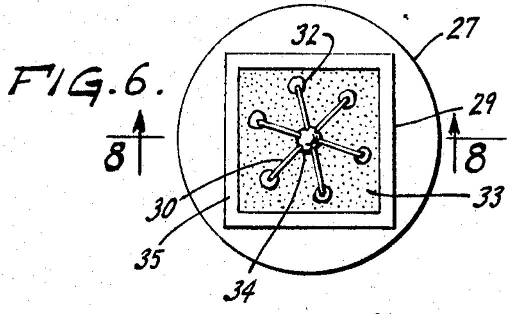
Figure 9:
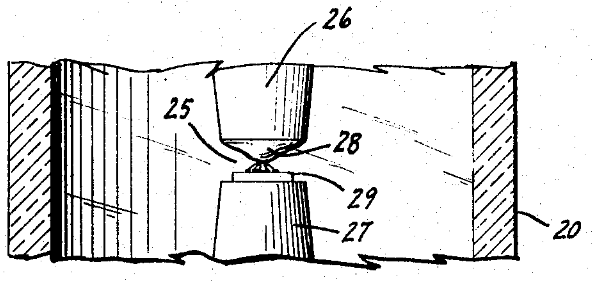
Figure 7:
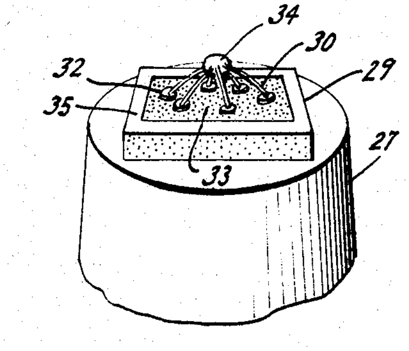
Figure 8:
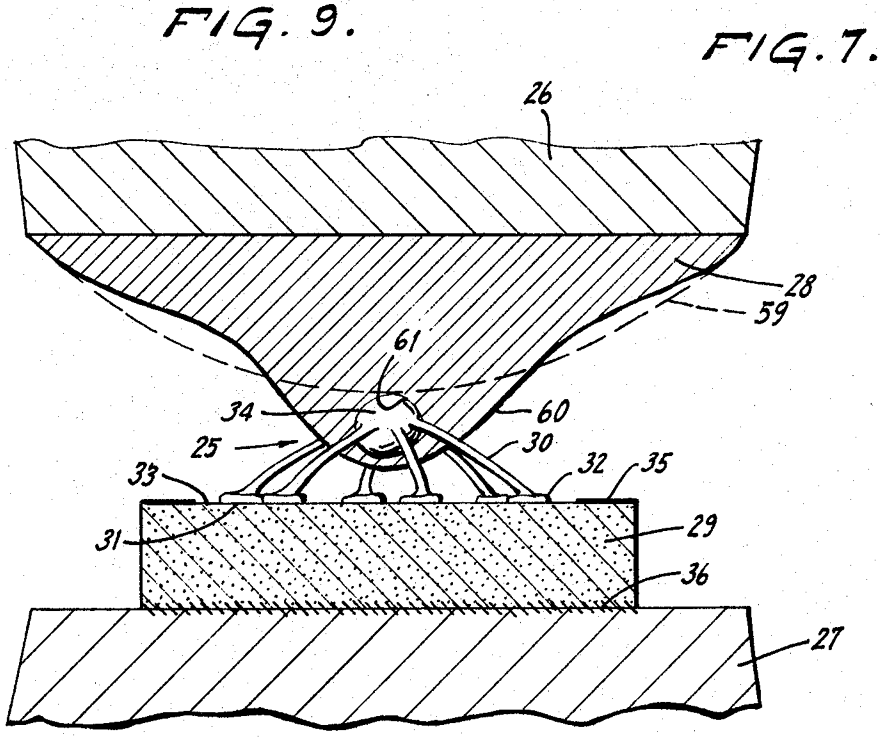

FIGURES 6 and 7 are, respectively, a plan view and a perspective view of the new diode, showing the same when completed to the extent indicated in FIGURE 5 and illustrating it on an additionally enlarged scale. FIGURE 8 shows principal parts of the diode on a still larger scale in a view generally similar to that of FIGURE 5 but more realistic in detail, the view being taken in central section as indicated by lines 8—8 in FIGURE 6. FIGURE 9 shows the same portions somewhat closer to actual size but still enlarged many times. FIGURE 10 shows the entire diode unit, again in similar sectional view but on a scale more closely approaching the smallness of the actual product.

For general orientation, brief reference will first be made to the completed diode unit (FIGURES 9 and 10). This unit comprises a tubular housing 20, opposite ends of which are closed by plugs 21, 22, each integral with an external terminal pin 23, 24. Internally of this housing the new connector structure 25 is supported on studs 26, 27 which are integral respectively with plugs 21, 22. The studs are shown as tapering inwardly and having truncated ends, one facing the other, the upper stud 26 carrying a solder bead 28 on its end and the lower stud 27 having semiconductor body 29 mounted thereon.

The new diode and connector structure 25 provided by the process of this invention (FIGURE 8) comprises a group of thin short wires 30, each connected to a small junction area 31 on simiconductor body 29, these wires being made of dustile metal, preferably gold. Each wire is shown as having a spread-out, flattened end or so-called "nailhead" 32 whereunder said junction area 31 is formed on top surface 33 of the semiconductor body. The opposite ends of the thin and short metal wires merge into a solid sphere 34 of the same metal. The group of nailheads 32 on semiconductor surface 33 is shown as surrounded by a passivating layer 35 (FIGURES 6 to 8). The complete diode 29 to be installed in housing 20 (FIGURE 10) is suitably bonded to lower stud 27, as is best indicated in FIGURE 8 at 36

Such bonding is utilized throughout the connecting procedure. This procedure begins (FIGURE 1) by individually attaching gold wires 37, of the desired thinness and initially of relatively long extension, to junction area 33, by nailheads 32. The attaching operation is carried out by means of a wire-guiding and attaching device or so-called capillary nozzle 38. This nozzle can be made for instance from a thin tube having a central bore 39 slightly larger than the thin gold wire; a lower end portion 40 of the tube can be drawn and narrowed into fine tapering shape, with an inner diameter substantially equal to the minute outside diameter of wire 37. An end surface 41 is provided on nozzle 38, normal to central bore 39 and with an outer diameter slightly larger than that of the gold wire.

An upper portion of nozzle 38 receives wire 37 from a small reel (not shown) and initially the wire and nozzle are brought to a position spaced above semiconductor 29, with wire 37 extending through nozzle 38. A small bead 42 (FIGURE 2) has previously been formed at a lower end of this wire; the bead-formnig operation will be described presently. At the present point (FIGURE 1, see vertical arrow pointing downwardly) it is to be noted that nozzle 38 is brought down to position 38A, which process brings the bead, attached to end portions of the thin wire, down onto the diode, where a final minute downward motion of the nozzle, preferably with simultaneous applciation of heat from any suitable source (not shown), results in the formation of a nailhead or thermocompression bond 32, gold bead 42 being flattened by end surface 41 of nozzle 38 against semi-conductor surface 33. Wire nozzle 38 is then upwardly slidingly withdrawn from the diode, along newly attached wire 37, as is indicated by the vertical arrow pointing upwardly and the full line showing in FIGURE 1.

Next, as indicated in full lines in FIGURE 2, a flame nozzle 44 is operated to momentarily pass the tip of a small flame 45 of suitable temperature across a certain portion 46 of wire 37 between nozzle 38 and diode 29, this wire portion being promptly liquefied thereby, as is suggested by broken line showing of said portion. The flame-cutting operation can be performed for instance by moving nozzle 44 and flame 45 so as to pass the tip of the flame across wire portion 46 in a motion which in FIGURE 2 occurs transversely of the plane of the paper and wherein wire portion 46 is heated for instance during five or ten milliseconds. The heat, thus momentarily applied to a point-like portion of gold wire element 46, momentarily melts and liquefies this portion, thereby also momentarily heating, melting and liquefying additional portions of this gold wire. The liquefied wire metal forms a pair of drops which migrate outwardly along the remaining structure of wire portion 46 due to the surface tension of such liquid, and which then congeal above and below the spot where the flame has passed. In this way the flame-cutting of the wire results in formation of the aforementioned gold bead 42 and an additional similar bead 47 therebelow, at the top end of the remaining wire portion 37A.

Although that wire portion is no longer held at 46 and although it is extremely thin, it is properly shown in FIGURE 3 as remaining in upstanding condition, like a small column. This effect is brought about by so arranging the wire-cutting nozzle 44, relative to diode 29, that the flame-cutting operation results in a wire portion 37A having limited length, relative to its minute thickness, thus allowing this column-like behavior on a microscopic scale.

It will be understood that flame nozzle 44 and flame 45 are only momentarily in the position shown in FIGURE 2 and have been removed therefrom by the time the small column 37A of wire material has been formed. Next, as indicated in FIGURE 2, wire nozzle 38 is microscopically moved (see small arrow) to a new position 38B suitable for attachment of an additional wire to diode surface 33 and cutting of the wire by repetition of the steps described with respect to FIGURE 1.

A plurality of wires are attached and cut in this way, as is indicated in FIGURE 3 by the showing of a group 48 of three wires, all having terminal beads at substantially uniform spacing from diode 29. Although these beads are then separated only by minute distances 49 it is possible to avoid undue reheating of previously formed beads, incident to the formation of a new bead, since the flame tip 50 utilized for the latter purpose passes the beads only momentarily and a certain distance above the bead level, as indicated. Finally, then, the wire attaching nozzle 38 can be withdrawn to a position such as the one indicated in FIGURE 2 at 38C. It will be seen that the nozzle, with gold wire and bead, has thus been restored to the initial position, mentioned above in connection with FIGURE 1.

Referring further to FIGURE 3, the fabricating process continues with the step of bending upper portions 51 of the wires in group 48 to tilt them toward each other and thereby to provide a small cluster 52 of wire beads contacting one another. This can be done by hand, under a fairly powerful microscope and with the aid of pincers having suitable, minutely ground jaws. Since the wires are of gold or other ductile metal they retain the bent form which is thus impressed on them. In order to avoid even the slightest resilient unbending and thus to keep the cluster of beads in closely packed form, as is desired, the bending can be accompanied or follower by a twisting motion, indicated by a curved arrow and which can be done by hand, with suitable tools, or by automatic tool operation.

Such twisting converts upper wire portions into a short helical or rope-like strand, as indicated at 53 in FIGURE 4, thereby maintaining a particularly closely formed and form-retaining bead cluster 54. However, the twisting can be omitted in some cases. In any event, further and relatively stronger heat treatment is then applied. This can be done by bringing an interior flame portion 55 onto the bead cluster, remelting the several gold beads of the cluster by the intense heat of this flame portion and thus converting them into small drops of liquid metal. Surface tension of the liquid metal again comes into action and the small drops are fused into a single, correspondingly larger metal ball 56. This fusing is particularly prompt in the bent and twisted cluster 53, 54 wherein the wire portions twisted about each other serve as a guide, positively causing the tiny metal drops to converge and coalesce at once.

As additionally shown in FIGURE 4, flame nozzle 44 can then be tilted or lowered to keep the flame thereof applied to an upper portion of gold ball 56 which has been formed by the preceding operations. This gold ball then recedes downwardly, as the heat stored therein melts adjacent portions 57 of the gold wires. The continued melting, aided if necessary by the continued flame application, causing a progressively larger gold sphere 58 to be formed. It leads finally to formation of the desired sphere 34, merging with very short wires 30 which lead to diode 29, as shown in FIGURE 5. Due to the high thermal conductivity of the gold in bead cluster 54 and spheres 56, 58, the heated wire portions 57 (FIGURE 4) are subjected to substantially simultaneous and uniform melting-down.

Although the gold sphere usually is of minute size, it retains heat in substantial amount, as applied to the extremely small mass of gold in the connected wires. Therefore, active heating by flame 45 can be discontinued after a short time interval, for instance after a half second of heat application. There follows a short cooling interval which serves to complete the desired connector unit 30, 34 (FIGURE 5). This latter time interval or cooling period may typically last a quarter second. Exact durations of these intervals depend largely on the number and cross-section of gold wires, united in the gold sphere; their total may vary from a score of milliseconds to a few seconds. Throughout the heating and cooling processes, applied to the sphere, overheating of diode 29 is prevented by utilizing stud 27 as a heat conductor, this stud being suitably connected to an ultimate heat sink (not shown). As a result of final cooling, the sphere and wires congeal and harden in the form shown in full lines in FIGURE 5.

As already indicated, this form is also shown in FIGURES 6 to 8. The spacing of sphere 34 above semiconductor surface 33 is desirably limited to the same order of magnitude as the diameter of the sphere. This diameter is substantially greater than the thickness of a wire 30 and preferably also greater than the diameter of a nailhead 32 but smaller than diode surface 33. Nailheads 32 are distributed over this surface (FIGURES 6 and 7), for instance in a single symmetrically arranged ring.

FIGURE 8 indicates a further operation, wherein an initially provided solder bead 59, held on upper stud 26 and merely contacting gold sphere 34, is converted into the ultimate solder bead 28 embedding the sphere. For this purpose suitable solder flux (not shown) is applied to the gold sphere, whereafter the entire diode unit 29, 30, 34 and its supporting stud 27 are inserted in housing 20, see FIGURES 9 and 10. Similarly inserted is the opposite stud 26 with the original solder bead 59 thereon, until this bead contacts the flux-coated gold sphere 34 as shown in FIGURE 8. Heat is then applied once more, for instance through stud 26, to soften and liquefy the solder. Under the influence of the flux, the liquid solder then creeps onto and over sphere 34, thereby forming the ultimate bead 28 with a small projection 60 thereon wherein the gold sphere is embedded. The heating of stud 26 is then discontinued to prevent the solder from ultimately reaching semiconductor surface 33.

In a preferred way of performing the new fabricating method a silicon clock or slab 29 is used which typically can have about 20 mils side length and be about 5 mils thick, with a passivating layer 35 thereon which can be for instance about .02 mil thick. A suitable number, such as 3, 6, or 10 or more gold wires 30 can then be thermocompressed onto the semiconductor surface, said wires being typically about 1 mil thick. Tin can be used for solder 28.

Depending on the exact methods used in preparing the semiconductor surface, wires 30 are made of gold which may or may not contain dopant impurities. This detail is of no significance for the gold wire bonding operations, as the amounts of dopant are invariably minute; the thermomechanical operations described herein are affected only by the melting and congealing characteristics of the gold.

For cutting and then fusing the wires, oxygen-hydrogen jet flames 45 can be used which are about one-half inch long and one-sixteenth inch thick and which by suitable controls (not shown) are kept at tip and core temperatures of about 1000 and 2000 degrees centigrade, respectively. Both of these temperatures are above the melting point of gold. The ambient can be at room temperature.

Gold beads 42, 47, formed by these flames, can have diameters of about 2 mils. They can be converted, respectively, into nailheads 32 measuring about 4 mils in diameter, and into a gold sphere 34 which can for instance have a diameter of about 5 to 6 mils, depending on the number of wires merging into it.

When finally completed in the way indicated by FIGURES 6 to 8, the new diode has connector means 25 consisting of uniquely short, thin wires 30 and which are arranged so as to provide not only adequate power dissipation but also substantially uniform distribution of currents over these several wires. In the absence of sphere 34, such wires could not be relied upon for adequate performance, even if made as short as indicated, since their minute extension into solder bead 60 would provide no assurance of uniform current distribution to the several wires. Such distribution is achieved only by contacting the extended inside surface 61 of solder bead 60 with the entire outside surface of conductive sphere 34, embedded therein, said sphere being homogeneous with the several wires 30.

The number of wires 30 which are thus connected to solder bead 60 can be as great as is allowed by the size of diode surface 33 whereto the several nailheads 32 are bonded. The number of wires isw not limited by problems of solder connection, as it was when attempts were made to establish such connection to the wires directly. By means of the new "spider" 30, 34 the desired high current high frequency operation can be performed with unequalled effectiveness.

Finally it may be noted that the new construction has high mechanical strength and resistance, for instance to the shocks and vibrations which are sometimes encountered. Incident to strong vibration or shock, upper and lower studs 26, 27 move minutely, but positively, one relative to the other. By virtue of the ductility and flexibility of gold wires 30, no appreciable mechanical stress is applied at such times either to nailhead bonds 32, 33 or to solder joint 60, 61. The new unit remains mechanically as well as electrically sound, even when used under extremely difficult conditions.

While only a single way of performing the method and a single product thereof have been fully described, it will be understood that the invention contemplates such variations and modifications as come within the scope of the appended claims.

We claim:

1. In the fabrication of a semiconductor: providing a surface region of the semiconductor with a group of spaced upstanding thin metal wires each having a bead of the same metal at a free end of the wire, a predetermined distance from the surface; forming a cluster of said beads, one in contact with another; melting the cluster and coalescing it into a metal ball; thereby melting adjacent portions of the wires; and merging the melting portions into said ball.

2. In fabrication as described in claim 1, forming said beads and performing said melting of the cluster by controlled applications of a flame.

3. A method of establishing connections for a high current high frequency semiconductor, comprising the steps of: mounting thin wires of metal on a surface of the semiconductor in spaced upstanding relationship relative to said surface and with a small bead of the same metal on the free end of each wire; bending said free ends to form a cluster of said beads; heating said cluster to transform it into a single body of liquid metal and thereby to melt portions of the wires progressing from said free ends toward but not entirely to said surface; and then cooling said metal body to solidify it.

4. A method as described in claim 3 additionally including the step of removing excess heat from said wires, through said semiconductor, during the heating of said cluster.

5. A method of fabricating a high frequency high current semiconductor diode, comprising the steps of: mounting thin wires of gold on a diode surface in spaced genrally parallel, upstanding relationship relative to said surface; flame cutting the wires to sever them to size and simultaneously form a small gold bead at the cut end of each wire, spaced from the diode surface; bending the mounted and flame-cut wires to arrange the gold beads as a compact cluster; flame-heating said cluster to melt it and adjacent wire portions and coalesce the metal thereof into a solid, spherical, metallic body; and congealing the coalesced metal when the coalescing thereof has brought said body to a location closely above said surface.

6. A method as described in claim 5 including the step of twisting said wires about each other, incident to said bending thereof.

7. A method as described in claim 5, characterized by forming a flame having a point-like tip and a relatively wide, intensely hot inner portion, momentarily applying the tip of the flame to said wires to perform said flame-cutting and forming of beads, and applying the inner portion of a similar flame during a longer time interval to said cluster to perform said flame-heating and coalescing.

References Cited by the Examiner

UNITED STATES PATENTS

| | | | |
|---|---|---|---|
| 2,897,419 | 7/1959 | Howland | 317—234 |
| 2,941,279 | 6/1960 | Freedman | 29—155.55 |
| 3,006,067 | 10/1961 | Anderson | 29—470 |
| 3,010,057 | 11/1961 | Albert | 317—234 |
| 3,136,032 | 6/1964 | Berndsen | 29—155.55 |

JOHN F. CAMPBELL, *Primary Examiner.*

WILLIAM I. BROOKS, *Examiner.*